(12) United States Patent
Puig

(10) Patent No.: US 7,761,197 B2
(45) Date of Patent: Jul. 20, 2010

(54) METHOD AND DEVICE FOR DETECTING AIR TURBULENCE IN THE ENVIRONMENT OF AN AIRCRAFT

(75) Inventor: Stephane Puig, Lauzerville (FR)

(73) Assignee: Airbus France, Toulouse (FR)

( * ) Notice: Subject to any disclaimer, the term of this patent is extended or adjusted under 35 U.S.C. 154(b) by 298 days.

(21) Appl. No.: 11/773,309

(22) Filed: Jul. 3, 2007

(65) Prior Publication Data

US 2008/0021601 A1    Jan. 24, 2008

(30) Foreign Application Priority Data

Jul. 18, 2006    (FR)    ..................... 06 06507

(51) Int. Cl.
  G06F 7/70    (2006.01)
  G06F 19/00   (2006.01)
  G06G 7/00    (2006.01)
  G06G 7/76    (2006.01)

(52) U.S. Cl. ................... 701/14; 340/588; 342/38; 342/120

(58) Field of Classification Search ................ 701/14; 340/501, 588, 589, 870.17, 968; 342/120
See application file for complete search history.

(56) References Cited

U.S. PATENT DOCUMENTS

| 3,935,460 | A  | * | 1/1976  | Flint .......................... 250/349 |
| 4,346,595 | A  | * | 8/1982  | Frosch et al. ............. 73/178 R |
| 5,117,689 | A  | * | 6/1992  | Gary ........................ 73/178 R |
| 6,237,405 | B1 | * | 5/2001  | Leslie ..................... 73/170.07 |
| 6,462,703 | B2 | * | 10/2002 | Hedrick ...................... 342/120 |
| 7,411,519 | B1 | * | 8/2008  | Kuntman et al. ............ 340/968 |
| 2008/0039988 | A1 | * | 2/2008 | Estabrook et al. ............. 701/14 |

FOREIGN PATENT DOCUMENTS

EP    0488004    6/1992

OTHER PUBLICATIONS

Preliminary Search Report dated Mar. 1, 2007.

* cited by examiner

*Primary Examiner*—Jack Keith
*Assistant Examiner*—Rami Khatib
(74) *Attorney, Agent, or Firm*—Dickinson Wright PLLC

(57) ABSTRACT

A device and method for detecting air turbulence determine a theoretical height corresponding to the difference between an extrapolated height of an isentropic trajectory and the current height of an aircraft. This theoretical height is compared with a height threshold indicating a risk of turbulence.

8 Claims, 2 Drawing Sheets

METHOD AND DEVICE FOR DETECTING AIR TURBULENCE IN THE ENVIRONMENT OF AN AIRCRAFT

BACKGROUND OF THE INVENTION

The present invention relates to a method and a device for detecting air turbulence in the environment of an aircraft, in particular of a transport plane.

More particularly, although not exclusively, the present invention is aimed at detecting and predicting, in the short term, turbulence such as clear air turbulence of CAT type or orographic waves in particular.

It is known that wind shears, that is to say abrupt variations in the strength and/or direction of the wind, are sometimes triggered with no visible manifestation, (generally above 15,000 feet, about 4500 meters) and are, therefore, called clear air turbulence (or clear sky turbulence). Such turbulence which is non convective generally appears in a hydrostatically stable air environment, that is to say in a region where the potential temperature (which is dependent on the static temperature and on the static pressure) will increase with altitude. Clear air turbulence usually appears near the tropopause, especially above mountains and especially in winter, and in particular in the vicinity of jet streams.

Such turbulence cannot generally be detected beforehand by way of standard airborne weather radars. Moreover, such clear air turbulence may last several minutes and bring about, in particular, the following effects:

- variations in vertical acceleration which, when they are negative, are liable to injure passengers;
- changes in the flight level (altitude), thereby increasing the risk of collision with the terrain overflown or with other aircraft; and
- a contribution to the fatigue of the airfoil Such turbulence therefore exhibits an unpredictable nature which may surprise the crew and the onboard systems. Clear air turbulence presents a natural risk for aircraft in flight. An aircraft in equilibrium may therefore be disturbed by passing through such a zone of turbulence. Moreover, turbulence of this type gives rise to additional fuel consumption (in particular on account of the necessity to avoid such a turbulence zone) and contributes to the fatigue of the aircraft and pilots (stress).

It is known that today weather radars allow the aircraft to distinguish precipitation zones to be avoided, generally within a radius of 100 nautical miles (about 180 kilometers). A display is usually provided on a navigation page which allows the pilot to judge the safest route to follow. Phenomena such as convective turbulence may be displayed within a radius of 40 nautical miles (about 75 kilometers), and air shear phenomena within a radius of 10 nautical miles (about 18 kilometers). However, weather radars are limited to the detection of convective turbulence exhibiting sufficient humidity, since such radars carry out Doppler-effect-based detection of the relative movement of humid air masses. They are therefore not operational below a moderate level of reflectivity.

DESCRIPTION OF THE PRIOR ART

To remedy this drawback, specific sensors which are intended to carry out measurements of temperature and wind several kilometers upstream of the aircraft are currently provided. These standard solutions usually take into account the assumption according to which clear air turbulence is tied to the strength of a horizontal temperature gradient. However, the various solutions proposed exhibit numerous drawbacks. In particular, they are expensive and voluminous and hence difficult to install on an aircraft. Moreover, they usually require maintenance operations that are difficult to carry out.

By way of illustration, the following standard solutions may be cited:

- a procedure and an apparatus for measuring the speed and the turbulence of atmospheric currents, described in document U.S. Pat. No. 6,480,142. This procedure and this apparatus use, to measure the parameters of an atmospheric turbulent current, Doppler shifted frequencies of a signal received by a radar. This signal arises from the sound generated aerodynamically by turbulent atmospheric currents. The Doppler bandwidth of the signal received is used to estimate the turbulence of the atmospheric current and the mean frequency in this band is processed to estimate the radial speed. The total speed of the current and its angle with respect to the line of sight may be estimated by determining the speeds for two radials and processing them;
- a passive system for measuring the atmospheric temperature, described in document U.S. Pat. No. 6,237,405, which uses a passive directional detector to detect the energy of a wavelength band emitted by a volume of gas. The resulting signal can be associated with an effective temperature. The effective temperature may be associated with an effective range. The system generates a temperature map which makes it possible to determine, at given time intervals, the atmospheric temperatures in an azimuthal plane associated with a range from the detector. The temperature map can then be used to calculate temperature gradients which can in their turn be used to calculate a mean Richardson number for an atmospheric layer. This calculation makes it possible to predict the presence of clear air turbulence; and
- a microwave apparatus, described in document EP-0 488 004, which measures temperature profiles and which makes it possible to predict clear air turbulence. A procedure provided in this prior document, for determining the Richardson number so as to predict clear air turbulence, uses measurements of potential temperature and determines a vertical gradient of potential temperature. For this purpose, a wind vector, given by the instrumentation of the airplane, is differentiated with respect to the potential temperature and is multiplied by the vertical gradient of potential temperature to obtain a parameter for determining the Richardson number. Its trend with respect to a threshold value is monitored to predict clear air turbulence.

SUMMARY OF THE INVENTION

The present invention relates to a method for detecting air turbulence in the environment of an aircraft, which makes it possible to remedy the aforesaid drawbacks.

For this purpose, according to the invention, said method is noteworthy in that, in the course of a flight of the aircraft, the following series of successive steps is carried out in an automatic and iterative manner;

A/at any instant ti:
a) the current values at said instant ti of the static temperature and of the static pressure, as well as the current values of auxiliary parameters tied to the flight of the aircraft are measured on board the aircraft;
b) a potential temperature $\theta_i$ is calculated on the basis of said current values of the static temperature and of the static pressure;

c) characteristics of the wind are determined;
d) on the basis of said characteristics of the wind and of said potential temperature θi, an extrapolated height hiE is determined, corresponding to the height attained by an isentropic trajectory of potential temperature θi, at a subsequent instant ti+1 such that ti+1=ti+Δt, Δt being a predetermined time interval; and B/ at the instant ti+1:
e) the current height hi+1 of the aircraft at this instant ti+1 is determined;
f) a theoretical height δi+1 is calculated, corresponding to the difference between said extrapolated height hiE and said current height hi+1;
g) this theoretical height is compared with a height threshold; and
h) if said theoretical height is below said height threshold, an alert signal is emitted signaling the detection of turbulence.

Thus, by virtue of the invention, the stability of an air layer is determined in real time, this making it possible to detect and predict the appearance of turbulence, in particular of clear air turbulence. As specified hereinbelow, the method in accordance with the invention makes it possible to detect, from a few seconds to a few tens of seconds before its appearance, a vertical acceleration peak caused by a vertical wind gust, the source of which would be turbulence, in particular clear air turbulence. Thus, the crew of the aircraft can take the necessary timely measures to avoid the aforesaid negative consequences (injured passengers, fatigue of the aircraft, etc.) of such turbulence.

The method in accordance with the invention uses measurements of air temperatures, as well as calculated components of the wind, to determine a theoretical height between isentropic trajectories, so as to deduce therefrom the dynamic stability of the air masses, thereby making it possible to detect and predict the appearance of turbulence. More precisely, the method relies on the theoretical calculation of the deviation between two isentropic trajectories of given potential temperatures.

Within the framework of the present invention, an isentropic trajectory illustrates an adiabatic profile (with no heat exchange) corresponding to a current of air parcels. An isentropic trajectory is determined by a level of potential temperature. In a standard fashion, the adjective isentropic connotes a transformation occurring at constant entropy (the entropy being a thermodynamic quantity which, in a transformation, is equal to the sum of the infinitesimal amounts of heat received from the exterior medium, relative to the absolute temperature of the fluid for each of the intermediate equilibrium states between an initial state and a final state).

The present invention therefore enables turbulence, such as clear air turbulence, orographic waves or other types of turbulence, to be detected and predicted in the short term.

Moreover, as specified hereinbelow, the implementation of the present invention is carried out on the basis of standard sensors which generally already exist on the aircraft, in contradistinction to the aforesaid known solutions. This naturally makes it possible to reduce the cost and the volume of the means used within the framework of the present invention.

It will be noted that the aforementioned document EP-0 488 004 does not disclose at least steps d, e, f, g and h in accordance with the invention, which relate in particular to the calculation of an extrapolated height and to the consideration thereof for detecting air turbulence.

In a particular embodiment, in step A/b), the potential temperature θi is calculated with the aid of the following expressions:

$$\begin{cases} \theta i = Ti(pO/pi)^D \\ D = R/Cp \end{cases}$$

in which:
pO is a predetermined value;
R is the universal ideal gas constant;
Cp is a specific heat constant of the air at constant pressure;
Ti is the current value of the static temperature at the instant ti; and
pi is the current value of the static pressure at the instant ti.

Furthermore, advantageously, in step A/c), to calculate the characteristics of the wind:
three components of the wind are calculated in a reference frame tied to the aircraft, on the basis of the current values of the following auxiliary parameters: the ground speed, the air speed, the sideslip and the incidence of the aircraft, said three components relating respectively to the roll, pitch and yaw axes of the aircraft; and
these three components are transformed into a terrestrial reference frame in such a way as to obtain said characteristics of the wind.

Additionally, advantageously, in step A/d), the following operations are carried out:
with the aid of the current height hi of the aircraft at the instant ti, and of the local slope of the wind, obtained on the basis of said wind characteristics determined in step A/c), a theoretical profile followed by an isentropic trajectory of potential temperature θi is extrapolated; and
the extrapolated height hiE corresponds to the height attained by this theoretical profile at the subsequent instant ti+1.

In a preferred embodiment, in step B/g), said height threshold Zthres is calculated beforehand with the aid of the following expression:

$$Zthres=(A.\theta.\Delta V^2)/(g.\Delta\theta)$$

in which:
A is a predetermined constant;
θ is the potential temperature at the instant ti+1;
ΔV represents a vertical shear of the horizontal wind;
g is the acceleration due to gravity; and
Δθ is a vertical gradient of potential temperature.

It will be noted that if an alert signal is emitted in step B/h), it is possible, in particular, to forewarn the passengers of the aircraft of the detection of turbulence and/or to take account of this detection in the piloting of the aircraft, for example by modifying the gains of the flight control laws or by implementing a turbulence zone avoidance manoeuvre.

In order to be able to get an accurate idea of the significance of the turbulence (that is to say of the level of the turbulence), advantageously, upon detection of turbulence, the following series of successive steps is moreover carried out in an automatic manner:
the vertical component of the wind existing outside the aircraft at the current position is determined;
this vertical component is filtered with respect to predetermined frequencies;
the quadratic mean is calculated over a predetermined time window of this filtered vertical component; and
a dissipation rate providing an indication as to the level of the turbulence is deduced from this quadratic mean and from a predetermined frequency The present invention also relates to a device for detecting air turbulence in the environment of an aircraft, in particular of a transport plane.

According to the invention, said device is noteworthy in that it comprises:

means for measuring on board the aircraft the current values of the static temperature and of the static pressure, as well as the current values of auxiliary parameters tied to the flight of the aircraft;

means for calculating, on the basis of the current values at any instant ti of the static temperature and of the static pressure, a potential temperature $\theta i$ relating to this instant ti;

means for determining characteristics of the wind;

means for determining, on the basis of said characteristics of the wind and of said potential temperature $\theta i$, an extrapolated height hiE corresponding to the height attained by an isentropic trajectory of potential temperature $\theta i$, at a subsequent instant ti+1 such that ti+1=ti+$\Delta$t, $\Delta$t being a predetermined time interval;

means for determining the current height of the aircraft;

means for calculating a theoretical height $\delta i+1$ corresponding to the difference between said extrapolated height hiE and the current height hi+1 at the instant ti+1;

means for comparing this theoretical height with a height threshold;

means for emitting an alert signal signaling the detection of turbulence, if said theoretical height is below said height threshold; and preferably means for determining said height threshold.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
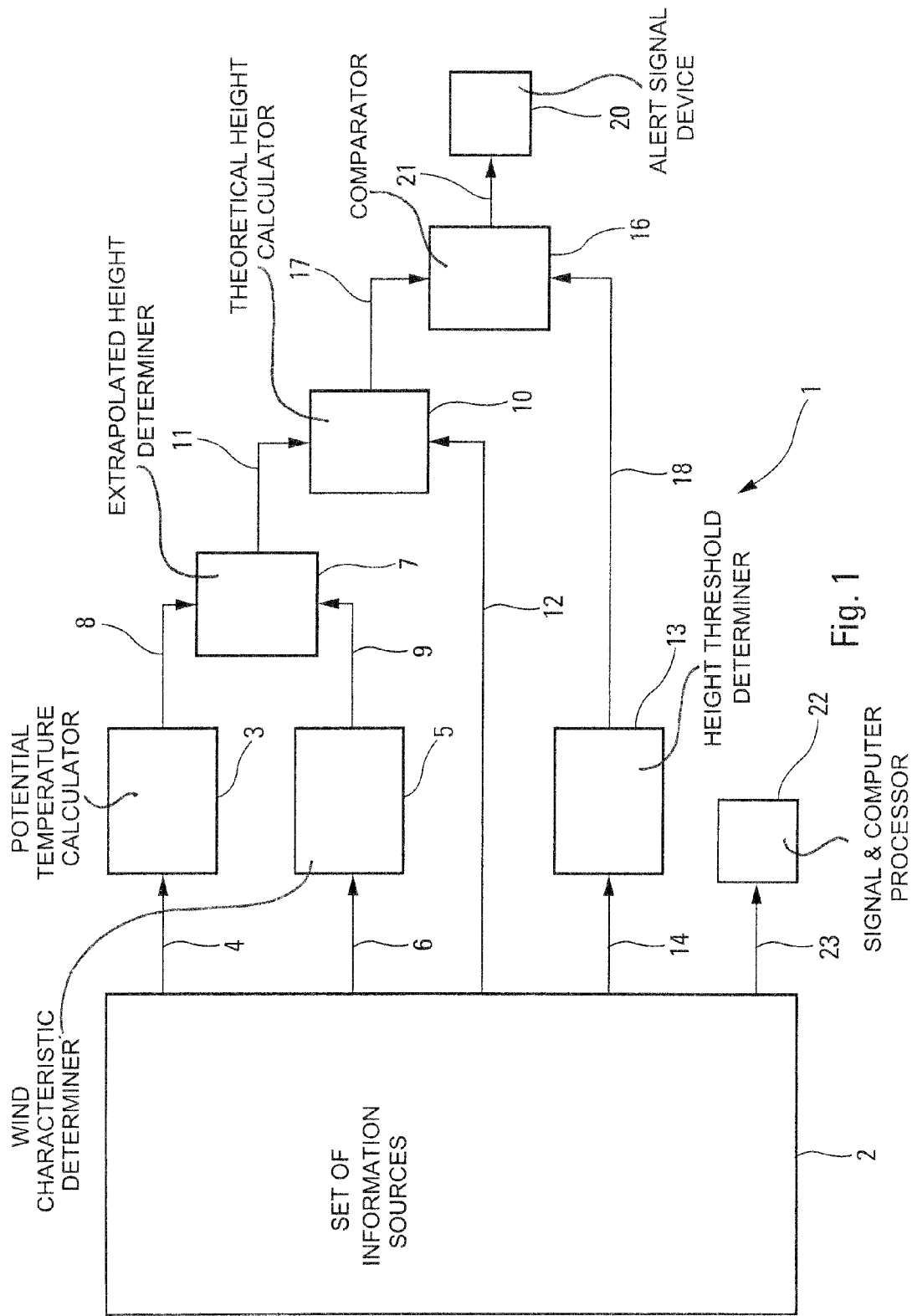
FIG. 1 is the schematic diagram of a device in accordance with the invention.

The device 1 in accordance with the invention and represented diagrammatically in FIG. 1 is intended to detect air turbulence in the environment of an aircraft A, in particular of a transport plane.

More particularly, although not exclusively, the present invention is aimed at detecting and predicting, in the short term, turbulence such as clear air turbulence of CAT type or orographic waves in particular.

According to the invention, said device 1 which is carried on board comprises the following automatic means:

a set 2 of information sources which comprises a plurality of different information sources. This set 2 comprises, in particular, standard means for measuring aboard the aircraft A the current values of the static temperature T and of the static pressure p, as well as the current values of auxiliary parameters specified hereinbelow, which are tied to the flight of the aircraft A (that is to say directly to particular parameters of the aircraft A or to events exterior to said aircraft A);

means 3 which are connected by way of a link 4 to said set 2 and which are formed in such a way as to calculate, on the basis of the current values (received from said set 2 and measured at any instant ti) of the static temperature Ti and of the static pressure pi, a potential temperature $\theta i$ specified hereinbelow, which therefore relates to this instant ti;

means 5 which are connected by way of a link 6 to said set 2 and which are formed in such a way as to determine characteristics of the wind existing outside the aircraft A;

means 7 which are connected by way of links 8 and 9 respectively to said means 3 and 5 and which are formed in such a way as to determine, on the basis of the wind characteristics received from said means 5 and of the potential temperature $\theta i$ received from said means 3, an extrapolated height hiE corresponding to the height attained by an isentropic trajectory of potential temperature $\theta i$ at a subsequent instant ti+1. This instant ti+1 is such that ti+1=ti+$\Delta$t, $\Delta$t being a predetermined time interval, for example a few seconds;

means (not represented specifically) which form part of said set 2 and which are intended to determine, in a standard fashion, the current height h of the aircraft A;

means 10 which are connected respectively by way of links 11 and 12 respectively to said means 7 and to said set 2 and which are formed in such a way as to calculate a theoretical height $\delta i+1$ (relating to the instant ti+1) corresponding to the difference between the extrapolated height hiE received from said means 7 and the current height hi+1 at the instant ti+1, which are measured by the aforesaid appropriate means of said set 2;

means 13 which are connected by way of a link 14 to said set 2 and which are formed in such a way as to determine a particular height threshold Zthresh;

means 16 which are connected by way of links 17 and 18 respectively to said means 10 and 13 and which are intended to compare the theoretical height $\delta i+1$ determined by said means 10 with the height threshold Zthresh determined by said means 13; and means 20 which are connected by way of a link 21 to said means 16 and which are formed in such a way as to emit an alert signal signaling the detection of turbulence, if the comparison carried out by said means 16 reveals that the theoretical height $\delta i+1$ is below the height threshold Zthresh.

Thus, the device 1 in accordance with the invention determines automatically, in real time, the stability of an air layer, thereby making it possible to detect and predict the appearance of turbulence, in particular of clear air turbulence. Said device 1 makes it possible to detect, from a few seconds to a few tens of seconds before its appearance, a vertical acceleration peak caused by a vertical wind gust, the source of which would be turbulence, in particular clear air turbulence. Thus, the crew of the aircraft A can take the necessary timely measures to avoid the negative effects (injured passengers, fatigue of the aircraft, etc.) liable to be produced by such turbulence.

As indicated previously, the device 1 in accordance with the invention uses measurements of the air temperature, as well as calculated components of the wind, to determine a theoretical height $\delta i+1$ between isentropic trajectories, so as to deduce therefrom the dynamic stability of the air masses, thereby making it possible to detect and predict the appearance of turbulence. More precisely, said device 1 relies on the theoretical calculation of the deviation between two isentropic trajectories T1 and T2 of given potential temperatures $\theta i$ and $\theta i+1$, represented in FIG. 2.

In a standard manner, a trajectory T1, T2 with equal potential temperature illustrates a current of dry air parcels. Within the framework of the present invention, an isentropic trajectory therefore represents an adiabatic profile (with no heat exchange) corresponding to a current of air parcels. An isentropic trajectory is thus determined by a level of potential temperature.

The device 1 in accordance with the present invention therefore enables turbulence, such as clear air turbulence, orographic waves or even other types of turbulence, to be detected and predicted in the short term.

Moreover, said device 1 uses standard sensors (forming part of the set 2) such as in particular anemometric probes and inertial platforms (accelerometers and gyrometers), which already exist on the aircraft A.

This naturally makes it possible to reduce the cost and the volume of said device 1.

A potential temperature $\theta$ is the temperature that an air parcel of temperature T would have if it were brought isentropically (adiabatic displacement) to a reference pressure of 1000 mb. In a particular embodiment, said means 3 calculate the potential temperature $\theta i$ at an instant $ti$, with the aid of the following expressions:

$$\begin{cases} \theta i = Ti(pO/pi)^D \\ D = R/Cp \end{cases}$$

in which:
pO is a predetermined value. Preferably, pO=1000 mb;
R is the universal ideal gas constant;
Cp is a specific heat constant of the air at constant pressure, with R/Cp=0.286;
Ti is the current value of the static temperature at the instant $ti$; and
pi is the current value of the static pressure p at the instant $ti$.

A surface of equal potential temperature therefore illustrates the current of dry air parcels. When a surface is inclined with respect to the horizontal, a rotation of the fluid is induced so as to bring the surface to the horizontal. Inclining a stable air surface amounts to destabilizing the surfaces, to decreasing the Richardson number specified hereinbelow, thereby increasing the risk of turbulence. This mechanism may originate from obstacles such as mountains, rising clouds, jet streams or fronts. The atmosphere therefore behaves as a fluid, and any disturbance triggers waves. Gravity waves, the source of which is gravity, represent the most significant small-scale wave when considering relief waves. Vertical propagation and breaking of gravity waves are mechanisms that generate clear air turbulence. This is why, within the framework of the present invention, the potential temperatures are determined on the basis of the static temperature and static pressure.

Preferably, the static pressure and the static temperature are measured by anemometric probes and are processed by an air data system, which generally exist on an aircraft A and which form part of said set 2.

Additionally, said means 5 which determine the characteristics of the wind use the following quantities:
the acceleration of the aircraft A along the three axes (roll, pitch, yaw), the ground speed, attitude angles and angle rates, which are provided by inertial platforms of the aircraft A;
the air speed which is provided by an air data system; and
the incidence which is calculated and the sideslips which are estimated by appropriate means.

These appropriate means, these inertial platforms and this air data system form part of said set 2. Said means 5 calculate, in a standard fashion, the three components of the wind in a reference frame tied to the aircraft A, on the basis of the ground speed, the air speed, the incidence and the sideslip. The components of the wind are thereafter transformed from said reference frame tied to the aircraft A to a terrestrial reference frame. This therefore yields two horizontal components (north, east) and one vertical component.

Consequently, to calculate the characteristics of the wind, the means 5 carry out the following operations:
they calculate the horizontal wind outside the aircraft A at the current position of said aircraft A;
they determine the vertical component of the wind existing outside the aircraft A at the current position of the latter; and
they refer the components of the wind to a terrestrial reference frame (north, east, downwards).

Figure 2:
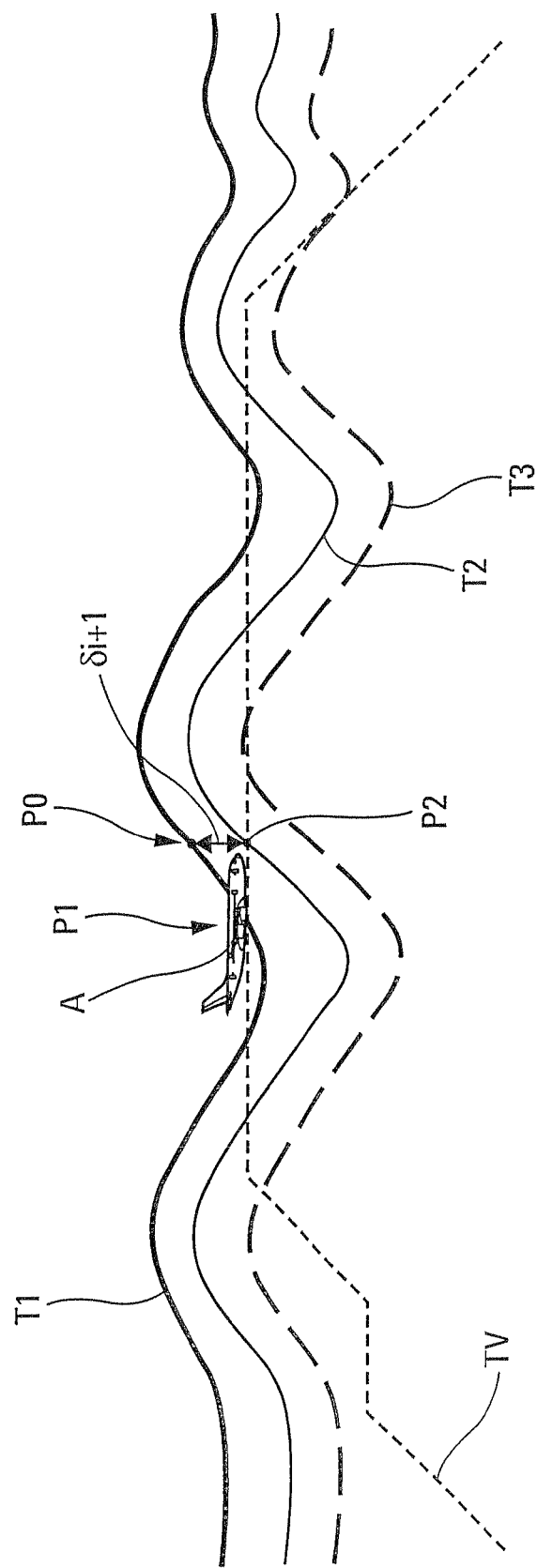
FIG. 2 is a graphic showing an airplane in flight and making it possible to illustrate an essential characteristic of the present invention.

Additionally to determine the extrapolated height hiE, the means 7 take into account the current height hi of the aircraft A at the instant $ti$. At this height hi, when the aircraft A is at the position P1 represented in FIG. 2, it lies on an isentropic trajectory T1 of potential temperature $\theta i$. By taking account of the local wind slope received from said means 5, said means 7 extrapolate a theoretical profile that is followed by this isentropic trajectory T1 of potential temperature $\theta i$. In FIG. 2, this isentropic trajectory T1 is represented by a thick continuous line.

The extrapolated height hiE then corresponds to the height attained by this theoretical profile T1 at a subsequent instant $ti+1$. In FIG. 2, the point PO attained by this theoretical profile T1 at said instant $ti+1$ has been shown.

To determine the theoretical height $\delta i+1$ relating to the instant $ti+1$, the means 10 compute the difference between this extrapolated height hiE (obtained as indicated previously, which represents the assumed height attained at the instant $ti+1$ by the isentropic trajectory T1 on which the aircraft A is situated at the instant $ti$) and the current height $hi+1$ of the aircraft A at this instant $ti+1$. At said instant $ti+1$, the aircraft A is situated at a position P2 and lies on an isentropic trajectory T2 of potential temperature $\theta i+1$.

In FIG. 2, a plurality of isentropic trajectories T1, T2, T3 have been shown. An exemplary flight trajectory TV of the aircraft A, comprising flat sections, as well as climbs and descents at constant slopes, have also been represented by dashed lines. As is clearly shown in FIG. 2, this flight trajectory TV of the aircraft A cuts numerous isentropic trajectories (T1, T2 and T3 in particular).

In a preferred embodiment, said means 13 calculate said height threshold Zthresh, with the aid of the following expression:

$$Z\text{thres} = (A.\theta.\Delta V^2)/(g.\Delta\theta)$$

in which:
A is a predetermined constant, preferably 0.25;
$\theta$ is the potential temperature at the instant $ti+1$;
$\Delta V$ represents a vertical shear of the horizontal wind;
g is the acceleration due to gravity; and
$\Delta\theta$ is a vertical gradient of potential temperature.

The above expression is obtained on the basis of the Richardson number Ri. This Richardson number is a measure of the probability of clear air turbulence and it indicates the appearance of turbulence when its value is below a critical value of 0.25. This Richardson number Ri satisfies, in standard fashion, the following relation:

$$Ri = (g/\theta).(\Delta\theta/\Delta V^2).\Delta Z$$

The turbulence condition Ri<0.25 may therefore be written:

$$(g/\theta).(\Delta\theta/\Delta V^2).\Delta Z < 0.25$$

$$\text{or } \Delta Z.(g.\Delta\theta)/(\theta.\Delta V^2) < 0.25$$

Stated otherwise, the height difference $\Delta Z$ must be less than $0.25$. $(\theta.\Delta V^2)/(g.\Delta\theta)$=Zthresh to indicate the appearance of turbulence, thereby making it possible to define the aforesaid threshold value Zthresh.

It will be noted that, according to the invention:

a horizontal wind V is calculated on the basis of standard measurements relating to aircraft (accelerations, air and ground speeds, attitude angles, angle rates and incidence). A variation $\Delta V$ in the horizontal wind (which variation is used as vertical shear) is determined by considering the difference between V(t) and V(t−$\Delta$t). This calculated $\Delta V$ is an approximation of the $\Delta V$ used in Richardson's formula; and for the potential temperature, the measurements carried out by standard static pressure and static temperature probes are used to calculate, in a standard fashion, a potential temperature $\Delta\theta$. Thereafter, the difference in potential temperatures between two times spaced apart by $\Delta t$ is computed to obtain the aforesaid gradient $\Delta\theta$.

It will be noted that if an alert signal is emitted by the means 20, the device 1 can, in particular with the aid of appropriate means (not represented), forewarn the passengers of the aircraft A of the detection of turbulence and ask them to fasten their seatbelt and/or take account of this detection in the piloting of the aircraft A, for example by modifying the gains of flight control laws for said aircraft A or by implementing a standard manoeuvre for avoiding the turbulent zone.

Of course, the device 1 in accordance with the invention carries out the aforesaid operations in an iterative and automatic manner.

In order to be able to get an accurate idea of the significance of detected turbulence, the device 1 moreover comprises means 22 which are, for example, connected by way of a link 23 to said set 2 and which comprise the following automatic means, not represented specifically:

means for determining the vertical component of the wind existing outside the aircraft A at the current position;

means for filtering this vertical component with respect to predetermined frequencies, namely the frequencies corresponding to the subinertial domain. It is also possible to carry out a filtering of the vertical acceleration of the aircraft A;

means for calculating the quadratic mean over a predetermined time window of this filtered vertical component; and means for deducing from this quadratic mean and from a predetermined frequency, utilizing the Kolmogorov assumptions, a dissipation rate (of "eddy dissipation rate" type) providing an indication as to the level of the turbulence.

The invention claimed is:

1. A method for detecting air turbulence in the environment of an aircraft, wherein, in the course of a flight of the aircraft, the following series of successive steps is carried out in an automatic and iterative manner;

A/ at any instant ti:

a) measuring, with a measuring device, the current values at said instant ti of the static temperature and of the static pressure, as well as the current values of auxiliary parameters tied to the flight of the aircraft on board the aircraft;

b) calculating a potential temperature $\theta i$ on the basis of said current values of the static temperature and of the static pressure;

c) determining characteristics of the wind;

d) determining on the basis of said characteristics of the wind and of said potential temperature $\theta i$, an extrapolated height hiE corresponding to the height attained by an isentropic trajectory of potential temperature $\theta i$, at a subsequent instant ti+1 such that ti+1=ti+$\Delta t$, $\Delta t$ being a predetermined time interval; and B/ at the instant ti+1:

e) determining the current height hi+1 of the aircraft at this instant ti+1;

f) calculating a theoretical height $\delta i+1$ corresponding to the difference between said extrapolated height hiE and said current height hi+1;

g) comparing this theoretical height with a height threshold; and h) emitting, if said theoretical height is below said height threshold, an alert signal signaling the detection of turbulence, wherein:

in step A/d), the following operation is carried out: extrapolating, with the aid of the current height hi of the aircraft at the instant ti and of the local slope of the wind obtained on the basis of said wind characteristics determined in step A/c), a theoretical profile followed by the isentropic trajectory of potential temperature $\theta i$; and the extrapolated height hiE corresponds to the height attained by this theoretical profile at the subsequent instant ti+1.

2. The method as claimed in claim 1, wherein in step A/b), the potential temnerature $\theta i$ is calculated with the aid of the following expressions:

$$\begin{cases} \theta i = Ti(pO/pi)^D \\ D = R/Cp \end{cases}$$

in which:

pO is a predetermined value;

R is the universal ideal gas constant;

Cp is a specific heat constant of the air at constant pressure;

Ti is the current value of the static temperature at the instant ti; and pi is the current value of the static pressure at the instant ti.

3. The method as claimed in claim 1, wherein in step A/c), to calculate the characteristics of the wind:

three components of the wind are calculated in a reference frame tied to the aircraft, on the basis of the current values of the following auxiliary parameters: the ground speed, the air speed, the sideslip and the incidence of the aircraft, said three components relating respectively to the roll, pitch and yaw axes of the aircraft; and these three components are transformed into a terrestrial reference frame in such a way as to obtain said characteristics of the wind.

4. The method as claimed in claim 1, wherein in step B/g), said height threshold Zthres is calculated beforehand with the aid of the following expression:

$$Z\text{thres}=(A.\theta.\Delta V^2)/(g.\Delta\theta)$$

in which:

A is a predetermined constant;

$\theta$ is the potential temperature at the instant ti+1;

$\Delta V$ represents a vertical shear of the horizontal wind;

g is the acceleration due to gravity; and

Δθ is a vertical gradient of potential temperature.

5. The method as claimed in claim 1, wherein in step B/h), if the alert signal is emitted, the passengers of the aircraft are forewarned of the detection of turbulence.

6. The method as claimed in claim 1, wherein in step B/h), if the alert signal is emitted, account is taken of the detection of turbulence in the piloting of the aircraft.

7. An aircraft, which comprises a device that implements the method specified under claim 1.

8. A method for detecting air turbulence in the environment of an aircraft, wherein, in the course of a flight of the aircraft, the following series of successive steps is carried out in an automatic and iterative manner;

A/ at any instant ti:
- a) measuring, with a measuring device, the current values at said instant ti of the static temperature and of the static pressure, as well as the current values of auxiliary parameters tied to the flight of the aircraft on board the aircraft;
- b) calculating a potential temperature θi on the basis of said current values of the static temperature and of the static pressure;
- c) determining characteristics of the wind;
- d) determining on the basis of said characteristics of the wind and of said potential temperature θi, an extrapolated height hiE corresponding to the height attained by an isentropic trajectory of potential temperature θi, at a subsequent instant ti+1 such that ti+1=ti+Δt, Δt being a predetermined time interval; and B/ at the instant ti +1:
- e) determining the current height hi+1 of the aircraft at this instant ti+1;
- f) calculating a theoretical height δi+1 corresponding to the difference between said extrapolated height hiE and said current height hi+1;
- g) comparing this theoretical height with a height threshold; and
- h) emitting, if said theoretical height is below said height threshold, an alert signal signaling the detection of turbulence, wherein:

upon detection of turbulence, the following series of successive steps is moreover carried out in an automatic manner:

the vertical component of the wind existing outside the aircraft at the current position is determined;

the vertical component is filtered with respect to predetermined frequencies;

the quadratic mean is calculated over a predetermined time window of this filtered vertical component; and a dissipation rate providing an indication as to the level of the turbulence is deduced from this quadratic mean and from a predetermined frequency.

* * * * *